UNITED STATES PATENT OFFICE.

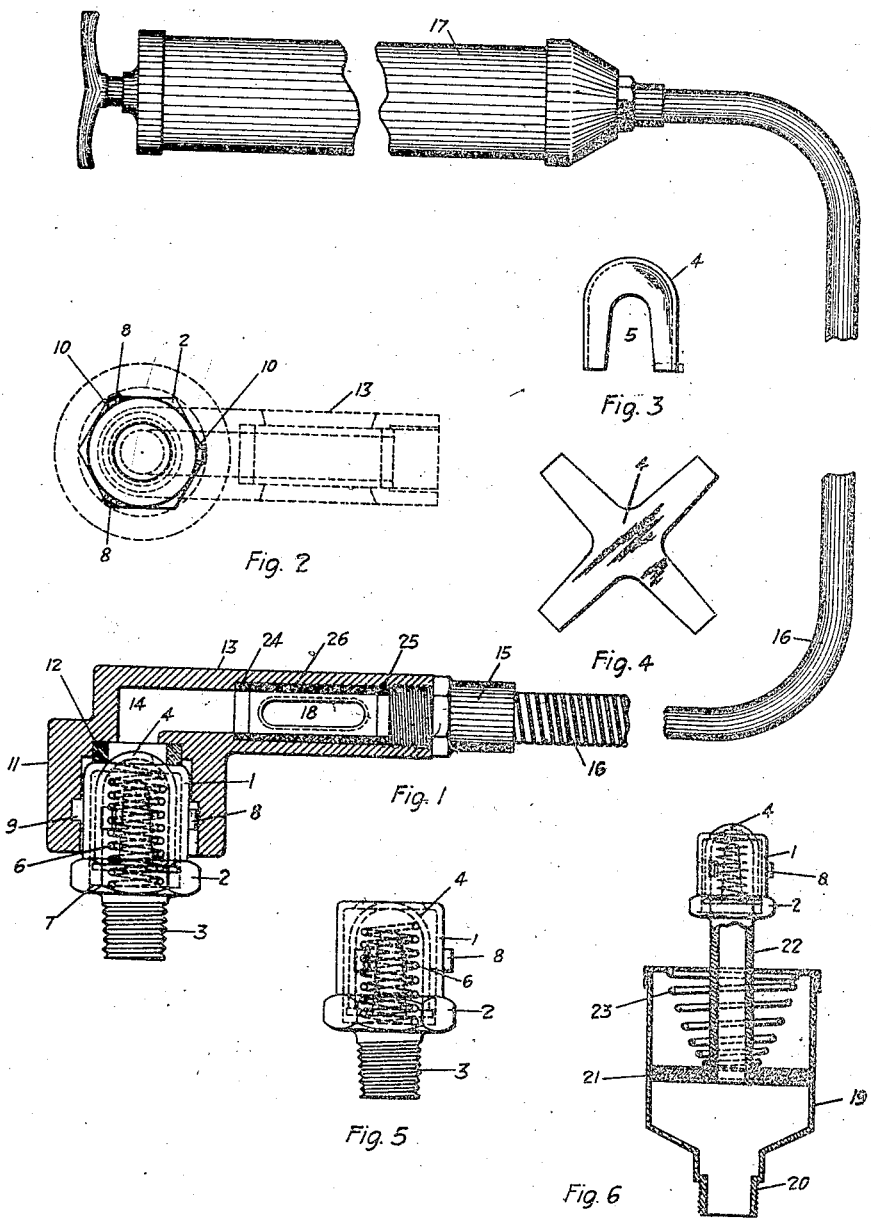

CLYDE G. BUTLER, OF DAYTON, OHIO, ASSIGNOR TO THE AUTOMOTIVE MANUFACTURING COMPANY, OF DAYTON, OHIO, A CORPORATION OF OHIO.

LUBRICATING DEVICE.

1,366,903. Specification of Letters Patent. Patented Feb. 1, 1921.

Application filed April 23, 1919. Serial No. 292,006.

*To all whom it may concern:*

Be it known that I, CLYDE G. BUTLER, a citizen of the United States, residing at Dayton, in the county of Montgomery and State of Ohio, have invented certain new and useful Improvements in Lubricating Devices, of which the following is a specification.

This invention relates to new and useful improvements in lubricating devices.

The primary object of this invention is to provide a lubricating device that is an efficient substitute for the common type of grease and oil cups that are difficult, and require much time, to fill. Furthermore, the caps are easily lost from said cups, with the result that dust and dirt fly into the cup and mix with the lubricant.

My invention not only obviates the above difficulties, but provides a cup to which a coupling on the end of a flexible hose on the pump, can be readily and firmly secured, for the purpose of forcing a lubricant quickly and under high pressure into said cup, with no danger of dust or dirt coming in contact with the oil or grease.

Other important and incidental objects will be brought out in the following specification and particularly set forth in the subjoined claims.

My invention is illustrated in the accompanying drawings, of which Figure 1 is an elevational view, partly in section, of the apparatus. Fig. 2 is a top plan view of the grease cup and coupling. Fig. 3 is a side view of the dome-shaped valve within the cup. Fig. 4 is a plan view of the blank from which said valve is made. Fig. 5 is a vertical sectional view of the grease cup, showing the valve depressed to a position to admit the grease. And Fig. 6 is a vertical sectional view of my improved cup attached to one in which the grease is automatically forced as needed to the part to be lubricated.

Throughout the specification and drawings, similar reference characters denote corresponding parts.

Referring to the accompanying drawings, the numeral 1 designates a hollow cup body terminating at its bottom marginal edge in a nut portion 2 and projecting nipple 3. The latter is adapted to be readily screwed into any place requiring lubrication. The cup, while particularly adapted for use in automobiles, may be employed to supply oil or grease to any part requiring lubrication.

That portion of the cup body 1 above the nut portion 2 is preferably cylindrical, with a beveled top marginal edge. In its top central portion there is provided a lubricant inlet-opening which is normally closed by a dome-shaped check valve 4 that is preferably formed from a metal blank shaped like a cross. (See Fig. 4.) The arms of the latter are bent downwardly to form the dome-shaped valve 4 shown in Fig. 3. There are thus formed in said valve four outwardly tapering openings 5 through which oil or grease may enter its hollow interior from the cup body 1, when said valve is forced below the top central opening in said body to admit the lubricant thereto.

The upper end of the dome-shaped valve 4 is held tightly in the central opening in the cup body 1, by a coil spring 6, whose lower portion seats upon an annular ledge in the nut portion 2 and whose upper end bears against the interior top portion of the dome-shaped check valve 4 to which it readily accommodates itself. When the valve 4 is forced downwardly against the tension of the spring 6, as shown in Fig. 5, it will so clear the central opening in the cup body 1 as to permit the lubricant to be forced into it, whence it will enter the dome-shaped valve through the openings 5 for a forced passage through the nipple 3 into the device or structure into which said nipple is screwed for the purpose of supplying lubricant thereto. When the valve 4 is fully depressed, its lower portion will engage and rest upon the annular ledge in the nut portion 2 of the nipple 3, as shown in Fig. 5. The cup body may be attached in any other way than that described to a device or structure to be lubricated, whether the latter be a part of an automobile, stationary machine or other apparatus.

When my improved cups are secured in the places where cups are needed, a grease gun may be readily secured to, and removed from, each cup in succession by the coupling now to be described. Projecting outwardly from the middle portion of the periphery of the cup body 1, are preferably three bayonet pins 8 that are adapted to enter an annular recess 9, through notches 10, provided in the inner wall of a hollow cylindrical coupling member 11 that is adapted to be fitted over the cup body 1. (See Figs. 1 and 2.) Contained in a socket portion within the member 11, is an annular gasket 12 that is adapted to engage and press downwardly below the central opening in the cup body 1, the check valve 4 when said member 11 is forced over said cup body. Before this pressure is exerted, the pins 8 must be in a position to enter the notches 10, and after sufficient force has been exerted to press the valve 4 below its seat, the coupling member 11 should be turned sufficiently to bring said pins within the annular groove 9 to lock said coupling member to the cup body for the lubricant-filling operation now to be described.

Referring to Figs. 1 and 2, the coupling member 11 preferably has a right-angled bend 13 which contains a bore 14 that communicates, at its forward end, through the annular gasket 12 and central opening in the cup body 1, with the interior of the latter when the valve 4 is below said opening as just described. Coupled to the outer end of the bend 13 by a coupling nipple 15, is one end of a flexible tube 16, the other end of which is connected to a high pressure grease gun 17. A sight opening 18 is provided in the bend 13 of the coupling member 11 to expose the lubricant passing therethrough, to view.

It will now readily be seen that when it is desired to force a lubricant into a cup 1, it is first necessary to place the coupling member 11 over the latter in such a position that the pins 8 will enter the notches 10, whereupon sufficient pressure is applied to the member 11 to force the valve 4 downwardly. The coupling member 11 is then turned a sufficient distance to bring the bayonet pins 8 within the annular groove 9, whereupon said coupling member will be locked to the cup body, with the valve 4 below the opening in the latter to permit it to receive an injection of lubricant from the gun 17 through the flexible tube 16, bore 14 and annular gasket 12. After entering the cup body 1 through its central opening, said lubricant will be forced into the dome-shaped check valve 4, through its openings 5, and then through the nipple 3 to the place where the lubricant is needed. After sufficient lubricant has been forced into said cup to supply the needed amount, the coupling member 11 may be quickly turned in the reverse direction a sufficient distance to bring the pins 8 within the notches 9, whereupon the said coupling member may be withdrawn from the cup body, and its valve closed by the spring 6 to prevent the entrance of dust or dirt and effectively to seal it against the egress of the oil or grease.

In Fig. 6 I have illustrated a grease cup of the automatic-pressure type, equipped with my improved lubricating device. In said figure the numeral 19 designates a hollow cylindrical cup which terminates at its lower end in a nipple portion 20. Movable in the cup 19 is a plunger 21 which is attached to a tubular stem 22 that communicates with that portion of the cup below said plunger. Surrounding said stem between the top of the cup 19 and the plunger 21, is a coil spring 23 that exerts its pressure against said plunger automatically to force the lubricant to the place where and when it is needed after said lubricant has been injected into the cup below the plunger.

For the purpose of quickly and efficiently forcing the lubricant into the cup 19, one of my improved cups 1 is secured to the upper end of the stem 22. Now, when it is desired to fill the cup 19 with oil or grease, the coupling member 11 is attached, as before described, to the cup 1 and the gun 17 operated, whereupon lubricant will be forced through the cup 1, and hollow stem 22, into the cup 19 below the plunger 21 until the latter has been forced thereby to its uppermost position in the cup, whereupon the coupling member 11 may be withdrawn in the usual way from the cup body 1. This is but one of the instances in which my improved lubricating device may be effectively used.

Inserted in the rear end of the bend 13 between annular gaskets 24 and 25, is a glass tube 26 through which the lubricant flows past the sight opening 18. Since the lubricant flows through the bend 13 under pressure, this glass tube is provided, the gaskets 24 and 25 preventing any of said lubricant from escaping through the elongated opening 18. (See Fig. 1.)

Having described my invention, I claim:

1. A grease cup of the type described comprising a hollow body portion adapted to be attached to the part to be lubricated and having a central opening in its upper portion, a dome shaped valve having openings in its periphery below its top portion to admit lubricant to its hollow interior, and a coil spring within said valve, adapted to force it normally into said central opening in the cup, for the purpose specified.

2. A grease cup of the type described comprising a hollow body portion adapted to be attached to the part to be lubricated, and having a central opening in its upper portion, a dome shaped valve having downwardly projecting openings in its periphery below its top portion, said openings tapering downwardly to the bottom edge of the valve to admit lubricant to its hollow interior, and a coil spring within said valve, adapted to force it normally into the central opening in the cup, for the purpose specified.

3. A grease cup of the type described comprising a hollow body portion adapted to be attached to the part to be lubricated, and having a central opening in its upper portion, a dome shaped valve formed from a metal blank shaped like a cross, the arms of the latter being bent downwardly to form tapering openings between them to admit lubricant to the interior portion of the valve, and a coil spring within the arm portion of said valve, adapted to force it normally into said opening, for the purpose specified.

In testimony whereof I have hereunto set my hand this 21st day of April, 1919.

CLYDE G. BUTLER.

Witness:
HOWARD S. SMITH.